(12) United States Patent
Srinivasan et al.

(10) Patent No.: US 7,609,767 B2
(45) Date of Patent: Oct. 27, 2009

(54) SIGNALING FOR FADING COMPENSATION

(75) Inventors: Sridhar Srinivasan, Seattle, WA (US); Shankar Regunathan, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1164 days.

(21) Appl. No.: 10/379,079

(22) Filed: Mar. 3, 2003

(65) Prior Publication Data

US 2003/0206583 A1   Nov. 6, 2003

Related U.S. Application Data

(60) Provisional application No. 60/377,628, filed on May 3, 2002.

(51) Int. Cl.
H04N 7/18   (2006.01)

(52) U.S. Cl. .......................... 375/240.25; 375/240.26

(58) Field of Classification Search ................................ 375/240.01–240.29
See application file for complete search history.

(56) References Cited

U.S. PATENT DOCUMENTS

| | | | |
|---|---|---|---|
| 5,568,167 A | 10/1996 | Galbi et al. | |
| 5,970,173 A | 10/1999 | Lee et al. | |
| 5,978,029 A * | 11/1999 | Boice et al. | 375/240.14 |
| 5,990,977 A | 11/1999 | Kaneda et al. | |
| 6,002,440 A | 12/1999 | Dalby et al. | |
| 6,071,004 A | 6/2000 | Le Gall et al. | |
| 6,094,455 A | 7/2000 | Katta | |
| 6,122,442 A | 9/2000 | Purcell et al. | |
| 6,233,278 B1 | 5/2001 | Dieterich | |
| 6,266,370 B1 | 7/2001 | Kamikura et al. | |
| 6,268,864 B1 * | 7/2001 | Chen et al. | 345/428 |
| 6,278,735 B1 * | 8/2001 | Mohsenian | 375/240 |
| 6,459,733 B1 | 10/2002 | Yokoyama et al. | |
| 6,466,624 B1 * | 10/2002 | Fogg | 375/240.27 |
| 6,606,409 B2 | 8/2003 | Warnick et al. | |
| 6,625,214 B1 | 9/2003 | Umehara | |
| 6,735,253 B1 * | 5/2004 | Chang et al. | 375/240.16 |
| 6,771,311 B1 | 8/2004 | Weldy | |
| 6,944,226 B1 * | 9/2005 | Lin et al. | 375/240.2 |
| 6,959,044 B1 * | 10/2005 | Jin et al. | 375/240.12 |
| 7,236,526 B1 | 6/2007 | Kitamura | |
| 2001/0014125 A1 | 8/2001 | Endo | |
| 2001/0016005 A1 | 8/2001 | Kamikura et al. | |

(Continued)

FOREIGN PATENT DOCUMENTS

EP   0 555 873   8/1993

(Continued)

OTHER PUBLICATIONS

Printouts of FTP directories from http://ftp3.itu.ch , 8 pp. (downloaded from the World Wide Web on Sep. 20, 2005).

(Continued)

*Primary Examiner*—Andy S Rao
(74) *Attorney, Agent, or Firm*—Klarquist Sparkman, LLP

(57) ABSTRACT

Techniques and tools for signaling for fading compensation in video processing applications are described. For example, a video encoder performs fading compensation on a reference image, signals that fading compensation is used, and signals fading parameters for the fading compensation. A video decoder receives the signaled information and performs fading compensation on the reference image according to the fading parameters.

38 Claims, 10 Drawing Sheets

Software 580 implementing fading estimation and/or compensation

U.S. PATENT DOCUMENTS

| | | | |
|---|---|---|---|
| 2002/0031178 | A1 | 3/2002 | Isozaki |
| 2002/0033901 | A1 | 3/2002 | Martin |
| 2005/0135484 | A1 | 6/2005 | Lee et al. |

FOREIGN PATENT DOCUMENTS

| | | |
|---|---|---|
| EP | 1037469 | 9/2000 |
| JP | 03-145392 | 6/1991 |
| JP | 06-046412 | 2/1994 |
| JP | 07-312751 | 11/1995 |
| JP | 10-136385 | 5/1998 |
| JP | 2000-261810 | 9/2000 |
| JP | 2001-231045 | 8/2001 |
| JP | 2002-051341 | 2/2002 |
| WO | WO 97/39577 | 10/1997 |

OTHER PUBLICATIONS

U.S. Appl. No. 60/341,674, filed Dec. 17, 2001, Lee et al.

ITU-T, "ITU-T Recommendation H.261: Video Codec for Audiovisual Services at $p \times 64$ kbits," 28 pp. (1993).

ITU-T, "ITU-T Recommendation H.262: Information Technology—Generic Coding of Moving Pictures and Associated Audio Information: Video!," 218 pp. (1995).

ITU-T, "ITU-T Reommendation H.263: Video Coding for Low Bit Rate Communication," 167 pp. (1998).

ISO/IEC, "ISO/IEC 11172-2: Information Technology—Coding of Moving Pictures and Associated Audio for Storage Media at up to About 1,5 Mbit/s," 122 pp. (1993).

ISO/IEC, "Information Technology—Coding of Audio-Visual Objects: Visual, ISO/IEC 14496-2, Committee Draft," 330 pp. (1998).

Joint Video Team of ISO/IEC MPEG and ITU-T VCEG, "Working Draft No. 2, Revision 2 (Joint Video Specification)" 106 pp. (Mar. 2002).

Kamikura et al., "Global Brightness-Variation Compensation for Video Coding," *IEEE Trans. on Circuits and Systems for Video Tech.*, vol. 8, No. 8, pp. 988-999 (Dec. 1998).

Nicolas et al., "Motion and Illumination Variation Estimation Using a Hierarchy of Models: Application to Image Sequence Coding," *Journal of Visual Comm. and Image Representation*, vol. 6, No. 4, pp. 303-316 (Dec. 1995).

Stuller et al., "Interframe Television Coding Using Gain and Displacement Compensation," *The Bell System Technical Journal*, vol. 59, No. 7 (Sep. 1980).

Cliff Reader, "History of MPEG Video Compression—Ver. 4.0," document marked Dec. 16, 2003.

Sullivan et al., "The H.264/AVC Advanced Video Coding Standard: Overview and Introduction to the Fidelity Range Extensions," SPIE Conference on Applications of Digital Image Processing XXVII, 21 pages (Aug. 2004).

Kikuchi, "Improved multiple frame motion compensation using frame interpolation," Joint Video Team (JVT) of ISO/IEC MPEG & ITU-T VCEG <ftp3.itu.ch/av-arch/jvt-site/2002_01_Geneva/JVT-B075.doc>, 8 pages, accessed May 23, 2007.

Hannuksela, "Coding of Scene Transitions," Document JVT-B043, $2^{nd}$ Meeting of the Joint Video Team (JVT) of ISO/IEC MPEG & ITU-T VCEG, <ftp3.itu.ch/av-arch/jvt-site/2002_01_Geneva/JVT-B043.doc>, 7 pages, accessed May 23, 2007.

Joint Video Team of ISO/IEC MPEG and ITU-T VCEG, "Joint Final Committee Draft (JFCD) of Joint Video Specification" JVT-D157, 207 pp. (Aug. 2002).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mook, "Next-Gen Windows Media Player Leaks to the Web," BetaNews, 17 pp. (Jul. 2002) [Downloaded from the World Wide Web on Aug. 8, 2003].

Wien, "Variable Block-Size Transforms for Hybrid Video Coding," Dissertation, 184 pp. (Feb. 2004).

Official Notice of Rejection, Japanese Patent Application No. 2003-128416, 2 pages, Jul. 26, 2005.

Official Notice of Rejection, Japanese Patent Application No. 2003-128416, 3 pages, Aug. 18, 2006.

Official Notice of Final Decision of Rejection, Japanese Patent Application No. 2003-128416, 2 pages, Apr. 27, 2007.

Official Notice of Rejection, Japanese Patent Application No. 2003-128416, 2 pages, Feb. 29, 2008.

Official Notice of Rejection, Japanese Patent Application No. 2007-195221, 5 pages, Feb. 29, 2008.

Official Notice of Final Decision of Rejection, Japanese Patent Application No. 2007-195221, 4 pages, Jul. 25, 2008.

Notice on Office Action, Chinese Patent Application No. 03124169.7, 7 pages, Jan. 28, 2005.

Notice of Preliminary Rejection, "The Examiner's Grounds for Rejection," Korean Patent Application No. 10-2003-26666, 2 pages, Jun. 22, 2005.

Communication (Partial European Search Report), European Patent Application No. 03008704.3-1247, 5 pages, Jul. 2, 2004.

Non-Final Office Action, U.S. Appl. No. 10/378,988, 16 pages, Oct. 20, 2006.

Final Office Action, U.S. Appl. No. 10/378,988, 11 pages, Nov. 15, 2007.

Non-Final Office Action, U.S. Appl. No. 10/378,988, 4 pages, Apr. 17, 2008.

Notice of Allowance and Fee(s) Due, U.S. Appl. No. 10/378,988, 7 pages, Sep. 26, 2008.

Communication (Partial European Search Report), European Patent Application No. 03008705.0-1247, 4 pages, Jul. 2, 2004.

Official Notice of Rejection, Japanese Patent Application No. 2003-128414, 2 pages, Jul. 26, 2005.

Official Notice of Rejection, Japanese Patent Application No. 2003-128414, 3 pages, Aug. 18, 2006.

Official Notice of Final Decision of Rejection, Japanese Patent Application No. 2003-128414, 3 pages, Apr. 27, 2007.

Notice on Office Action, Chinese Patent Application No. 03124160.3, 5 pages, Jan. 28, 2005.

Notice of Preliminary Rejection, "The Examiner's Grounds for Rejection," Korean Patent Application No. 10-2003-26663, 2 pages, Jun. 22, 2005.

* cited by examiner

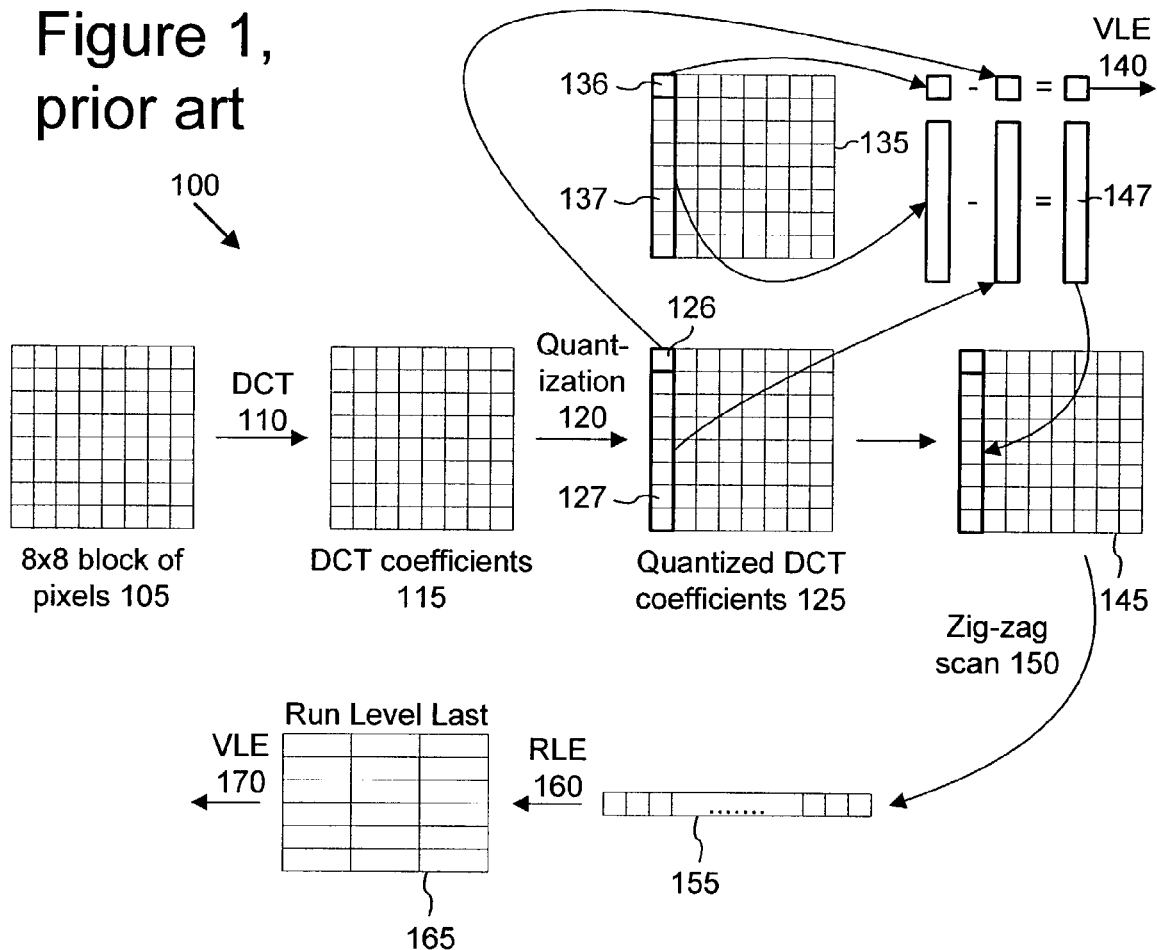
Figure 1, prior art
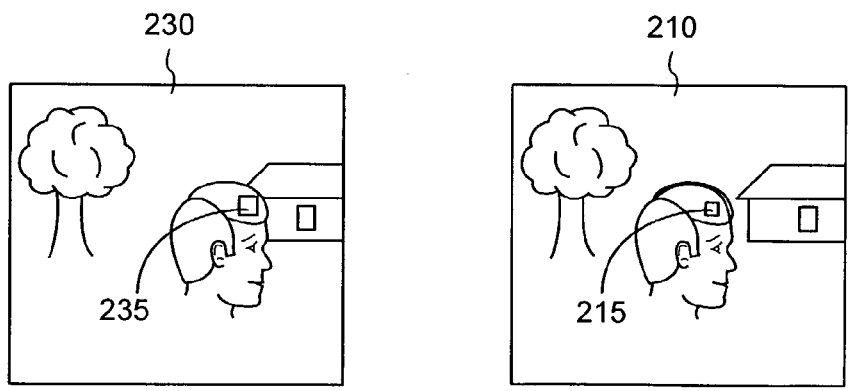
Figure 2, prior art

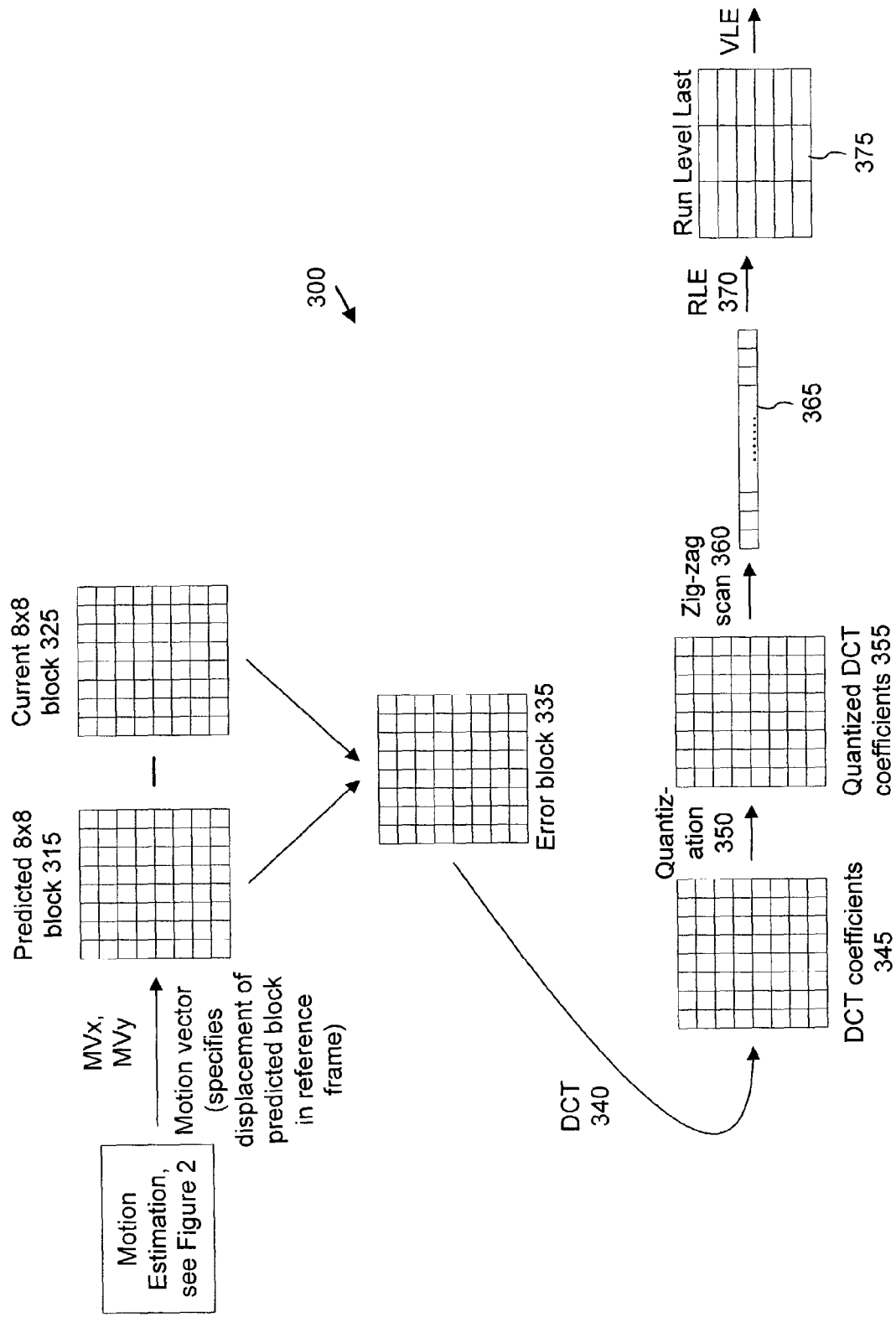
Figure 3, prior art

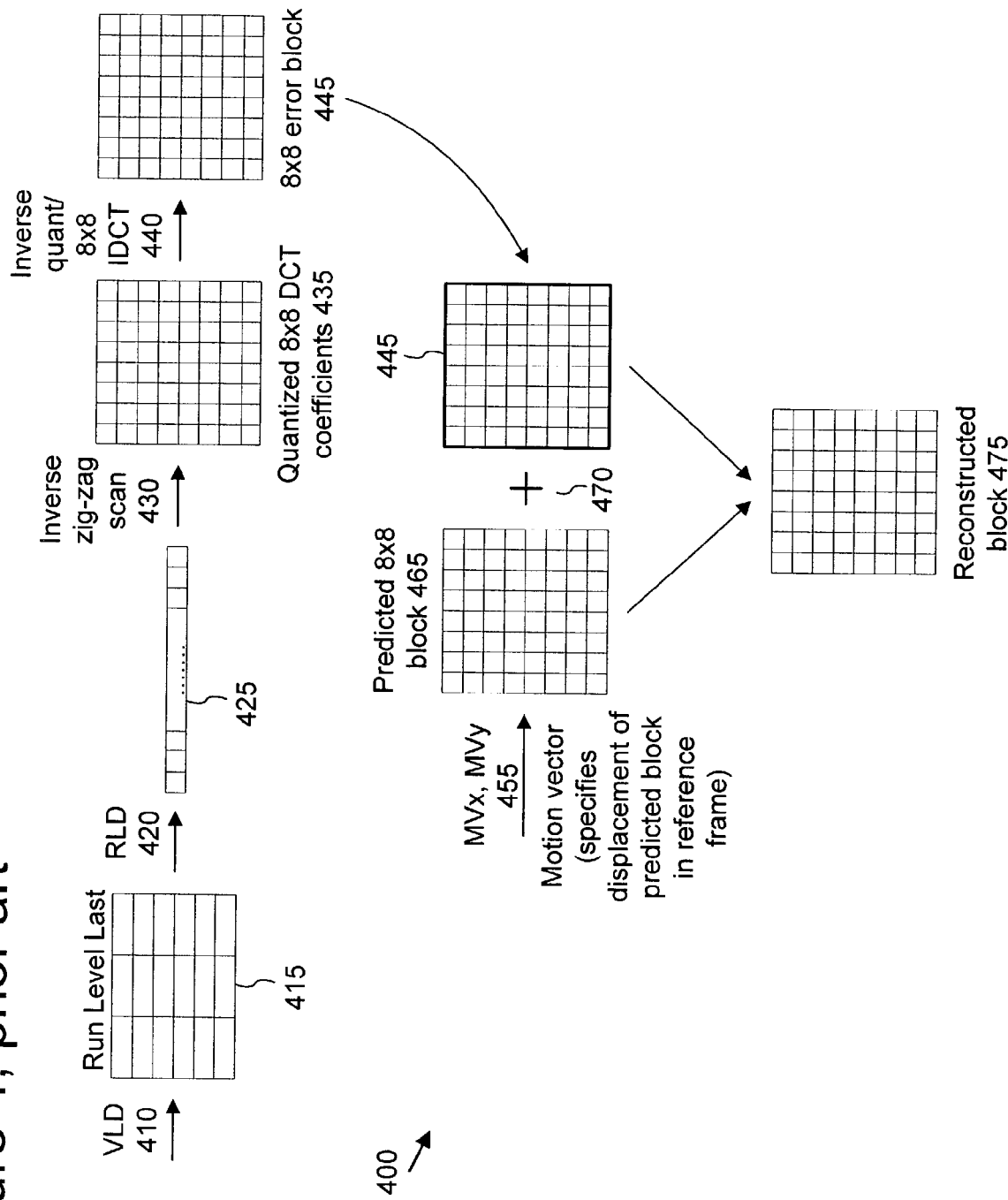
Figure 4, prior art

Software 580 implementing fading
estimation and/or compensation

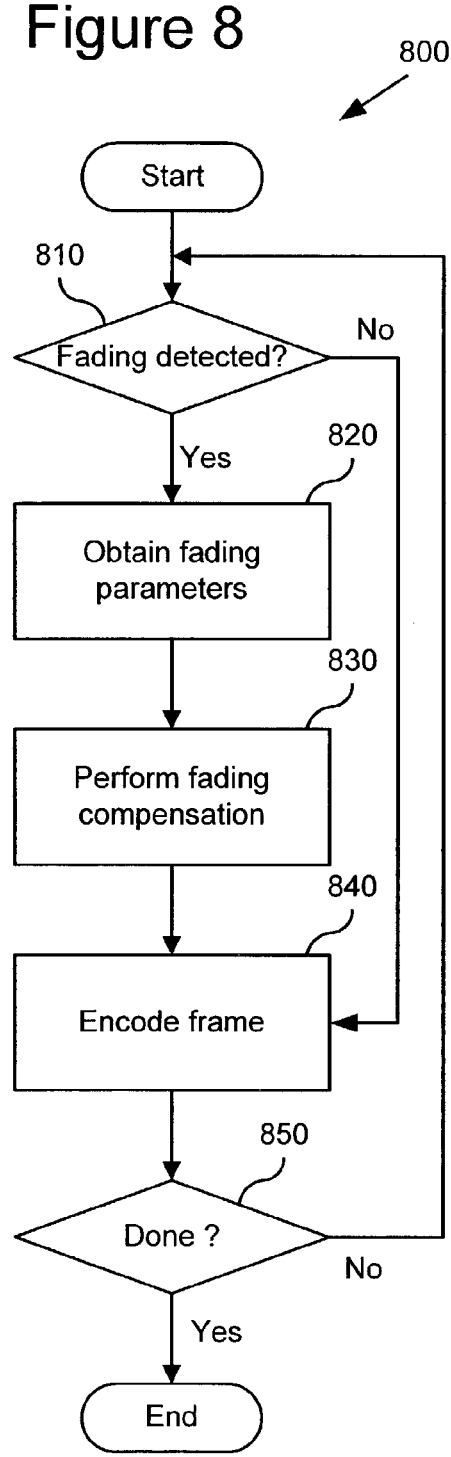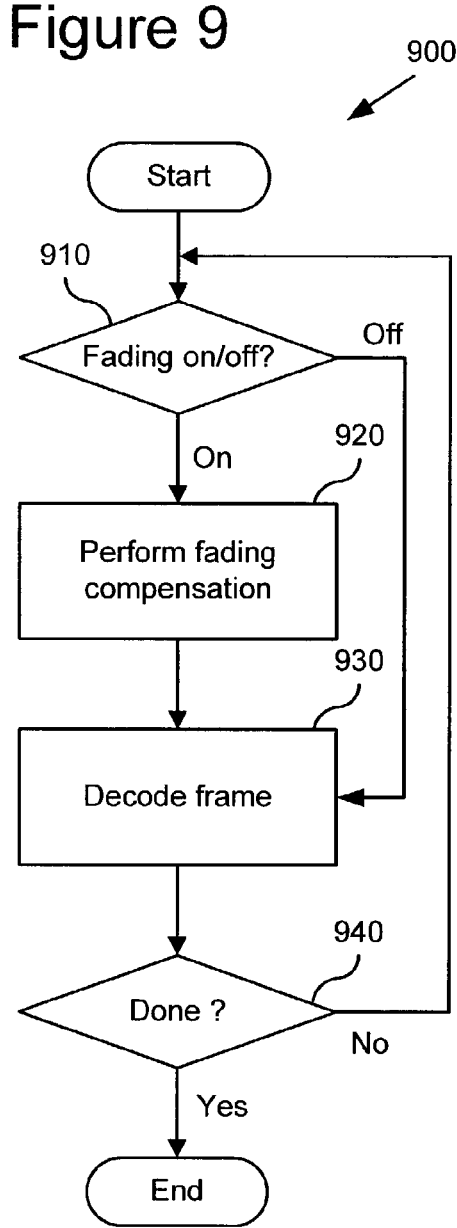

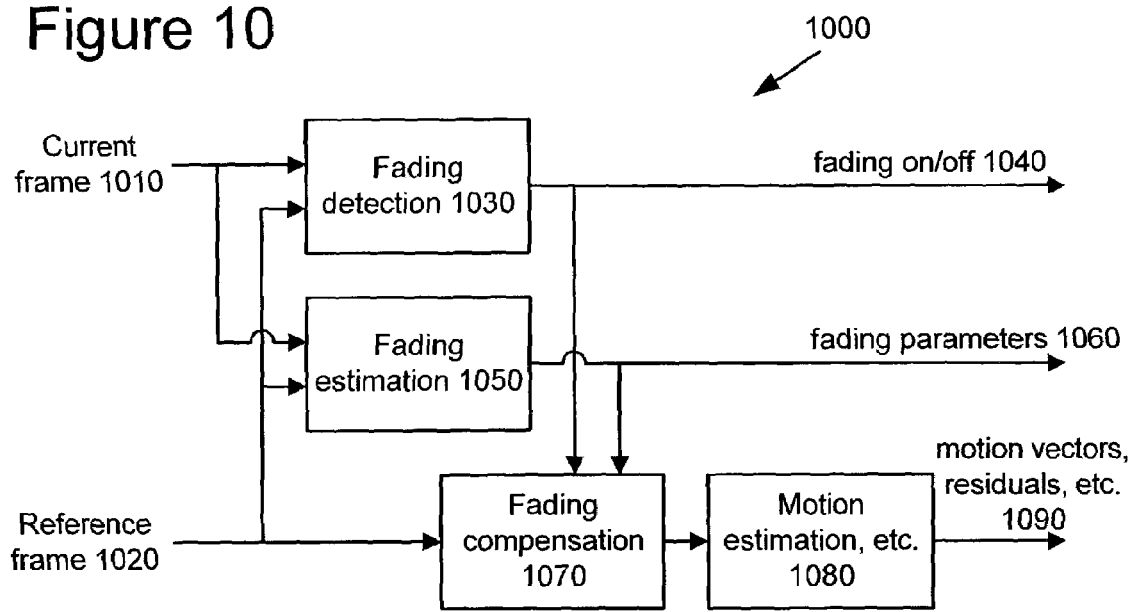
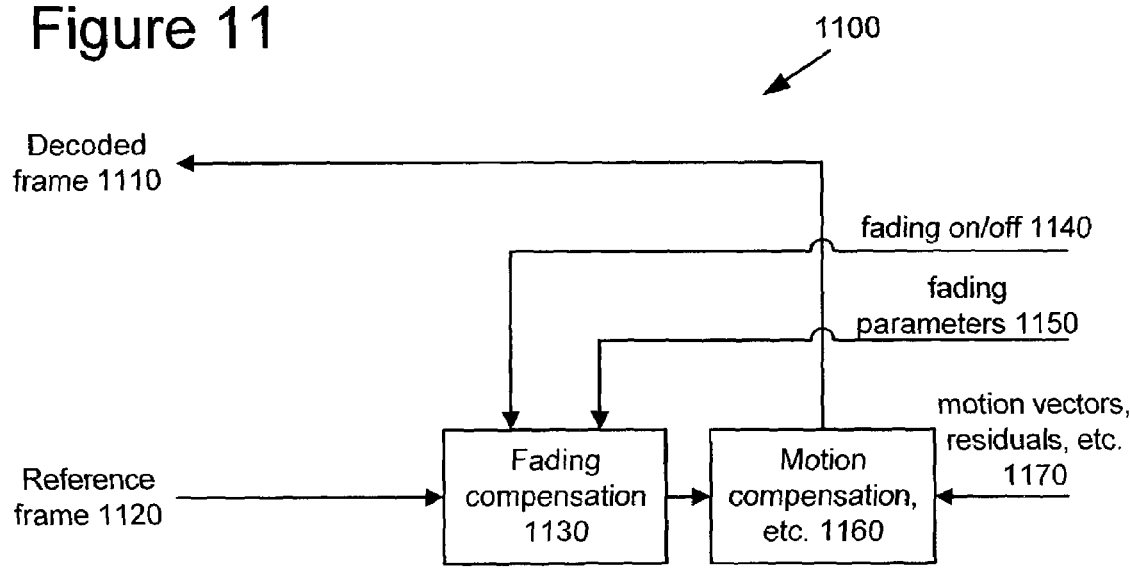

SIGNALING FOR FADING COMPENSATION

RELATED APPLICATION INFORMATION

This application claims the benefit of U.S. Provisional Patent Application Ser. No. 60/377,628, filed May 3, 2002, which is incorporated herein by reference. This application relates to U.S. patent application Ser. No. 10/378,958, entitled "Parameterization for Fading Compensation," filed concurrently herewith, and U.S. patent application Ser. No. 10/378,988, entitled "Fading Estimation/Compensation," filed concurrently herewith, the disclosures of which are incorporated herein by reference.

TECHNICAL FIELD

Techniques and tools for signaling for fading compensation in video processing applications are described. For example, a video encoder performs fading compensation on a reference image, signals that fading compensation is used, and signals fading parameters for the fading compensation.

BACKGROUND

Digital video consumes large amounts of storage and transmission capacity. A typical raw digital video sequence includes 15 or 30 frames per second. Each frame can include tens or hundreds of thousands of pixels (also called pels). Each pixel represents a tiny element of the picture. In raw form, a computer commonly represents a pixel with 24 bits. Thus, the number of bits per second, or bit rate, of a typical raw digital video sequence can be 5 million bits/second or more.

Most computers and computer networks lack the resources to process raw digital video. For this reason, engineers use compression (also called coding or encoding) to reduce the bit rate of digital video. Compression can be lossless, in which quality of the video does not suffer but decreases in bit rate are limited by the complexity of the video. Or, compression can be lossy, in which quality of the video suffers but decreases in bit rate are more dramatic. Decompression reverses compression.

In general, video compression techniques include intraframe compression and interframe compression. Intraframe compression techniques compress individual frames, typically called I-frames or key frames. Interframe compression techniques compress frames with reference to preceding and/or following frames, which are typically called predicted frames, P-frames, or B-frames.

Microsoft Corporation's Windows Media Video, Version 8 ["WMV8"] includes a video encoder and a video decoder. The WMV8 encoder uses intraframe and interframe compression, and the WMV8 decoder uses intraframe and interframe decompression.

A. Intraframe Compression in WMV8

FIG. 1 shows an example of block-based intraframe compression (100) of a block (105) of pixels in a key frame in the WMV8 encoder. For example, the WMV8 encoder splits a key video frame into 8×8 blocks of pixels and applies an 8×8 Discrete Cosine Transform ["DCT"] (110) to individual blocks, converting the 8×8 block of pixels (105) into an 8×8 block of DCT coefficients (115). The encoder quantizes (120) the DCT coefficients, resulting in an 8×8 block of quantized DCT coefficients (125) which the encoder then prepares for entropy encoding.

The encoder encodes the DC coefficient (126) as a differential from the DC coefficient (136) of a previously encoded neighbor (e.g., neighbor block (135)) of the block being encoded. The encoder entropy encodes the differential (140). FIG. 1 shows the left column (127) of AC coefficients encoded as a differential (147) from the left column (137) of the neighboring (to the left) block (135). The remaining AC coefficients are from the block (125) of quantized DCT coefficients.

The encoder scans (150) the 8×8 block (145) of predicted, quantized AC DCT coefficients into a one-dimensional array (155) and then entropy encodes the scanned AC coefficients using a variation of run length coding (160). The encoder selects an entropy code from one or more run/level/last tables (165) and outputs the entropy code (170).

B. Interframe Compression in WMV8

Interframe compression in the WMV8 encoder uses block-based motion compensated prediction coding followed by transform coding of the residual error. FIGS. 2 and 3 illustrate the block-based interframe compression for a predicted frame in the WMV8 encoder. In particular, FIG. 2 illustrates motion estimation for a predicted frame (210) and FIG. 3 illustrates compression of a prediction residual for a motion-estimated block of a predicted frame.

For example, the WMV8 encoder splits a predicted frame into 8×8 blocks of pixels. Groups of four 8×8 blocks form macroblocks. For each macroblock, a motion estimation process is performed. The motion estimation approximates the motion of the macroblock of pixels relative to a reference frame, for example, a previously coded, preceding frame. In FIG. 2, the WMV8 encoder computes a motion vector for a macroblock (215) in the predicted frame (210). To compute the motion vector, the encoder searches in a search area (235) of a reference frame (230). Within the search area (235), the encoder compares the macroblock (215) from the predicted frame (210) to various candidate macroblocks in order to find a candidate macroblock that is a good match. After the encoder finds a good matching macroblock, the encoder outputs information specifying the motion vector (entropy coded) for the matching macroblock so the decoder can find the matching macroblock during decoding. When decoding the predicted frame (210) with motion compensation, a decoder uses the motion vector to compute a prediction macroblock for the macroblock (215) using information from the reference frame (230). The prediction for the macroblock (215) is rarely perfect, so the encoder usually encodes 8×8 blocks of pixel differences (also called the error or residual blocks) between the prediction macroblock and the macroblock (215) itself.

FIG. 3 illustrates an example of computation and encoding of an error block (335) in the WMV8 encoder. The error block (335) is the difference between the predicted block (315) and the original current block (325). The encoder applies a DCT (340) to the error block (335), resulting in an 8×8 block (345) of coefficients. The encoder then quantizes (350) the DCT coefficients, resulting in an 8×8 block of quantized DCT coefficients (355). The quantization step size is adjustable. Quantization results in loss of precision, but not complete loss of the information for the coefficients.

The encoder then prepares the 8×8 block (355) of quantized DCT coefficients for entropy encoding. The encoder scans (360) the 8×8 block (355) into a one dimensional array (365) with 64 elements, such that coefficients are generally ordered from lowest frequency to highest frequency, which typically creates long runs of zero values.

The encoder entropy encodes the scanned coefficients using a variation of run length coding (370). The encoder selects an entropy code from one or more run/level/last tables (375) and outputs the entropy code.

FIG. 4 shows an example of a corresponding decoding process (400) for an inter-coded block. Due to the quantization of the DCT coefficients, the reconstructed block (475) is not identical to the corresponding original block. The compression is lossy.

In summary of FIG. 4, a decoder decodes (410, 420) entropy-coded information representing a prediction residual using variable length decoding (410) with one or more run/level/last tables (415) and run length decoding (420). The decoder inverse scans (430) a one-dimensional array (425) storing the entropy-decoded information into a two-dimensional block (435). The decoder inverse quantizes and inverse discrete cosine transforms (together, 440) the data, resulting in a reconstructed error block (445). In a separate motion compensation path, the decoder computes a predicted block (465) using motion vector information (455) for displacement from a reference frame. The decoder combines (470) the predicted block (465) with the reconstructed error block (445) to form the reconstructed block (475).

The amount of change between the original and reconstructed frame is termed the distortion and the number of bits required to code the frame is termed the rate for the frame. The amount of distortion is roughly inversely proportional to the rate. In other words, coding a frame with fewer bits (greater compression) will result in greater distortion, and vice versa.

C. Limitations of Conventional Motion-Based Video Compression

Video sequences with effects such as fading, morphing, and blending require relatively large amounts of bits to encode because conventional motion-based video compression methods are generally not effective on such frames. For example, consider a video sequence in which an object in a frame has moved slightly in one direction from one frame to the next. In a typical block-matching motion estimation technique, it may be a simple matter in a video sequence without fading to find a good match in the previous frame for a block in the current frame and encode the resulting motion vector. However, if, for example, a "fade-to-black" is occurring in the video sequence, every luminance value in the current frame may have changed relative to the previous frame, preventing the video encoder from finding a good match for the block. Fading also may occur in a sequence due to natural illumination changes. Blending and morphing, which are other transitioning effects, may also reduce the effectiveness of straightforward motion estimation/compensation.

D. Standards for Video Compression and Decompression

Aside from WMV8, several international standards relate to video compression and decompression. These standards include the Motion Picture Experts Group ["MPEG"] 1, 2, and 4 standards and the H.261, H.262, and H.263 standards from the International Telecommunication Union ["ITU"]. Like WMV8, these standards use a combination of intraframe and interframe compression, although the standards typically differ from WMV8 in the details of the compression techniques used. For example, Annex P of the H.263 standard describes a Reference Picture Resampling mode for use in prediction that can be used to adaptively alter the resolution of pictures during encoding.

Given the critical importance of video compression and decompression to digital video, it is not surprising that video compression and decompression are richly developed fields. Whatever the benefits of previous video compression and decompression techniques, however, they do not have the advantages of the following techniques and tools.

SUMMARY

One of the goals of video compression is to improve rate-distortion performance—in other words, to achieve the same quality using fewer bits, or to use the same amount of bits but achieve higher quality. One way to achieve this goal is to identify portions of video sequences that require relatively large amounts of bits to encode, and then find ways to better compress such portions. Portions of video sequences with effects such as fading, morphing, and blending are infrequent, but require relatively large amounts of bits to encode when they do occur because conventional motion-based video compression methods are generally not effective on such portions.

Accordingly, in summary, the detailed description is directed to various techniques and tools for improving rate-distortion performance for video sequences that include fade-ins, fade-outs, cross-fades, or other fading, blending, or morphing effects. For example, a video encoder performs fading compensation for a current frame by adjusting a reference frame. This makes motion compensation using the reference frame more efficient. The video encoder then signals how a corresponding video decoder should perform the fading compensation. A video decoder receives the signaled information and performs the fading compensation by adjusting the reference frame. In particular, the detailed description addresses efficient ways to signal fading compensation information, which reduces the bitrate associated with the fading compensation information for typical video sequences.

In a first set of techniques and tools, a video encoder or decoder processes a fading compensation on/off signal for a video image (e.g., current video frame). For example, a video encoder determines the value for the on/off signal depending on whether fading compensation is used for the video image. The video encoder then transmits the on/off signal (along with fading parameters, if fading compensation is used). A corresponding video decoder receives the on/off signal (along with any fading parameters), and then determines whether fading compensation is on or off for the video image based upon the on/off signal.

In a second set of techniques and tools, a fading compensation on/off signal is jointly entropy encoded with other image-level information (e.g., motion mode information), which reduces the bitrate associated with on/off signals in typical video sequences. For example, one or more entropy codes jointly represent the on/off signal for a video image along with other image-level information for the video image.

In a third set of techniques and tools, a video encoder or decoder processes a fading compensation capability signal in a video sequence. If fading compensation is enabled, the video encoder or decoder processes one or more on/off signals for video images in the video sequence. For example, the capability signal is at the sequence level, and the on/off signals are at the image level.

The various techniques and tools can be used in combination or independently. Different embodiments implement one or more of the described techniques and tools.

Additional features and advantages will be made apparent from the following detailed description of different embodiments that proceeds with reference to the accompanying drawings.

BRIEF DESCRIPTION OF THE DRAWINGS

FIG. 1 is a diagram showing block-based intraframe compression according to the prior art.

FIG. 2 is a diagram showing motion estimation in a video encoder according to the prior art.

FIG. 3 is a diagram showing block-based interframe compression according to the prior art.

FIG. 4 is a diagram showing block-based interframe decompression according to the prior art.

FIG. 8 is a flowchart showing a technique for encoding video using fading estimation and compensation.

FIG. 9 is a flowchart showing a technique for decoding video encoded using fading compensation.

FIG. 10 is a block diagram of a video encoder system capable of performing fading estimation and compensation.

FIG. 11 is a block diagram of a video decoder system capable of performing fading compensation.

DETAILED DESCRIPTION

Figure 5:
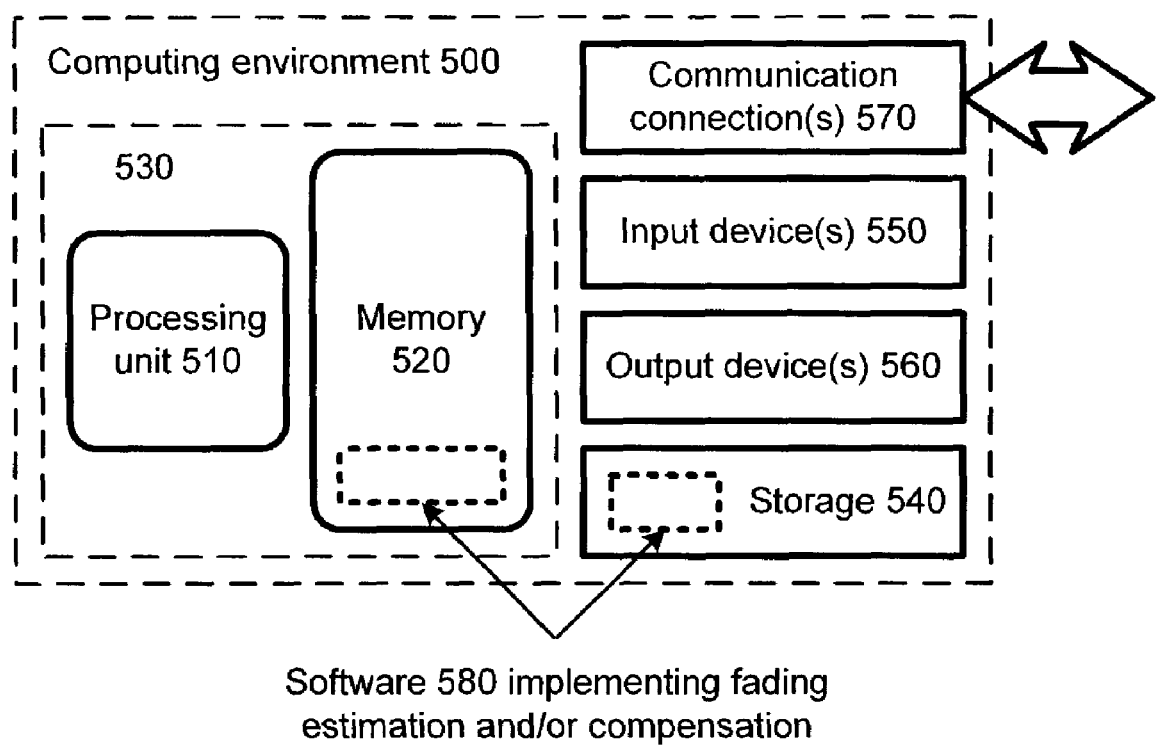
FIG. 5 is a block diagram of a suitable computing environment in which several described embodiments may be implemented.

Described embodiments relate to techniques and tools for fading estimation and/or compensation. Without fading compensation/estimation, video sequences with effects such as fading, morphing, and blending require relatively large amounts of bits to encode because conventional motion-based video compression methods are generally not effective on such frames. Described embodiments improve rate-distortion performance by performing fading estimation/compensation in such sequences. Various embodiments relate to techniques and tools for estimating, applying, coding and/or decoding global luminance change parameters.

Fading compensation in some embodiments involves performing a global luminance change to one or more reference frames to compensate for fading. A global luminance change is a luminance change across a defined region, which may be a frame, a part of a frame (e.g., an individual block or macroblock in a frame, or a group of macroblocks in a frame), or another specific portion of an image being coded or decoded. A current frame is then predicted by motion estimation/compensation from the adjusted one or more reference frames. Alternatively, fading compensation involves a global change to a reference frame to compensate for effects such as blending or morphing. Generally, fading compensation includes any compensation for fading (i.e., fade-to-black or fade-from-black), blending, morphing, or other natural or synthetic lighting effects that affect pixel value intensities. Without loss of generality, however, the terms global luminance change and fading are used interchangeably herein, unless the context clearly shows otherwise.

As an alternative to performing fading compensation on frames, some embodiments perform fading compensation on fields, object layers or other images.

In some embodiments, fading compensation occurs by adjusting pixel values in the luminance and chrominance channels of a reference frame in YUV color space. The adjustment includes scaling and shifting luminance pixel values and scaling and shifting chrominance pixel values. Alternatively, the color space is different (e.g., YIQ or RGB) and/or the compensation uses other adjustment techniques.

An encoder/decoder performs fading estimation/compensation on a frame-by-frame basis. Alternatively, an encoder/decoder performs fading estimation/compensation on some other basis or on a portion of a frame such as one or more blocks or macroblocks.

The various techniques and tools can be used in combination or independently. Different embodiments implement one or more of the described techniques and tools. Although the operations for these techniques are typically described in a particular, sequential order for the sake of presentation, it should be understood that this manner of description encompasses minor rearrangements in the order of operations, unless a particular ordering is required. For example, operations described sequentially may in some cases be rearranged or performed concurrently. Moreover, for the sake of simplicity, flowcharts typically do not show the various ways in which particular techniques can be used in conjunction with other techniques.

In some embodiments, the video encoder and decoder use various flags and signals in a bitstream. While specific flags and signals are described, it should be understood that this manner of description encompasses different conventions (e.g., 0's rather than 1's) for the flags and signals.

I. Computing Environment

FIG. 5 illustrates a generalized example of a suitable computing environment (500) in which several of the described embodiments may be implemented. The computing environment (500) is not intended to suggest any limitation as to scope of use or functionality, as the techniques and tools may be implemented in diverse general-purpose or special-purpose computing environments.

With reference to FIG. 5, the computing environment (500) includes at least one processing unit (510) and memory (520). In FIG. 5, this most basic configuration (530) is included within a dashed line. The processing unit (510) executes computer-executable instructions and may be a real or a virtual processor. In a mult-processing system, multiple processing units execute computer-executable instructions to increase processing power. The memory (520) may be volatile memory (e.g., registers, cache, RAM), non-volatile memory (e.g., ROM, EEPROM, flash memory, etc.), or some combination of the two. The memory (520) stores software (580) implementing an encoder or decoder, such as a video encoder or decoder.

A computing environment may have additional features. For example, the computing environment (500) includes storage (540), one or more input devices (550), one or more output devices (560), and one or more communication connections (570). An interconnection mechanism (not shown) such as a bus, controller, or network interconnects the components of the computing environment (500). Typically, operating system software (not shown) provides an operating environment for other software executing in the computing environment (500), and coordinates activities of the components of the computing environment (500).

The storage (540) may be removable or non-removable, and includes magnetic disks, magnetic tapes or cassettes, CD-ROMs, DVDs, or any other medium which can be used to store information and which can be accessed within the computing environment (500). The storage (540) stores instructions for the software (580) implementing the encoder or decoder.

The input device(s) (550) may be a touch input device such as a keyboard, mouse, pen, or trackball, a voice input device, a scanning device, or another device that provides input to the computing environment (500). For audio or video encoding, the input device(s) (550) may be a sound card, video card, TV tuner card, or similar device that accepts audio or video input in analog or digital form, or a CD-ROM or CD-RW that reads audio or video samples into the computing environment (500). The output device(s) (560) may be a display, printer, speaker, CD-writer, or another device that provides output from the computing environment (500).

The communication connection(s) (570) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (500), computer-readable media include memory (520), storage (540), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "estimate," "signal," "encode," and "decode" to describe computer operations in a computing environment. These terms are high-level abstractions for operations performed by a computer, and should not be confused with acts performed by a human being. The actual computer operations corresponding to these terms vary depending on implementation.

II. Generalized Video Encoder and Decoder

Figure 6:
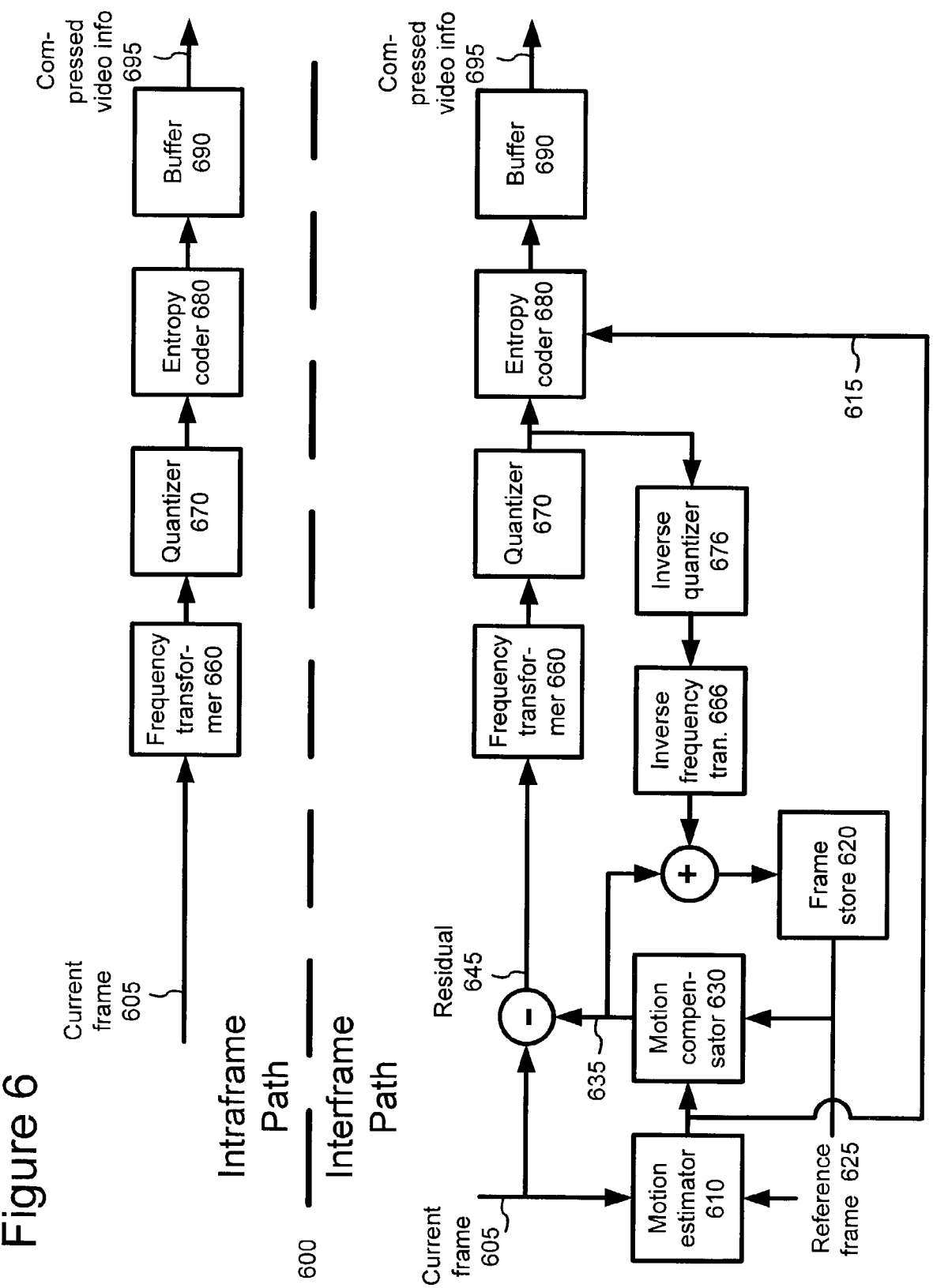
FIG. 6 is a block diagram of a generalized video encoder system used in several described embodiments.
Figure 7:
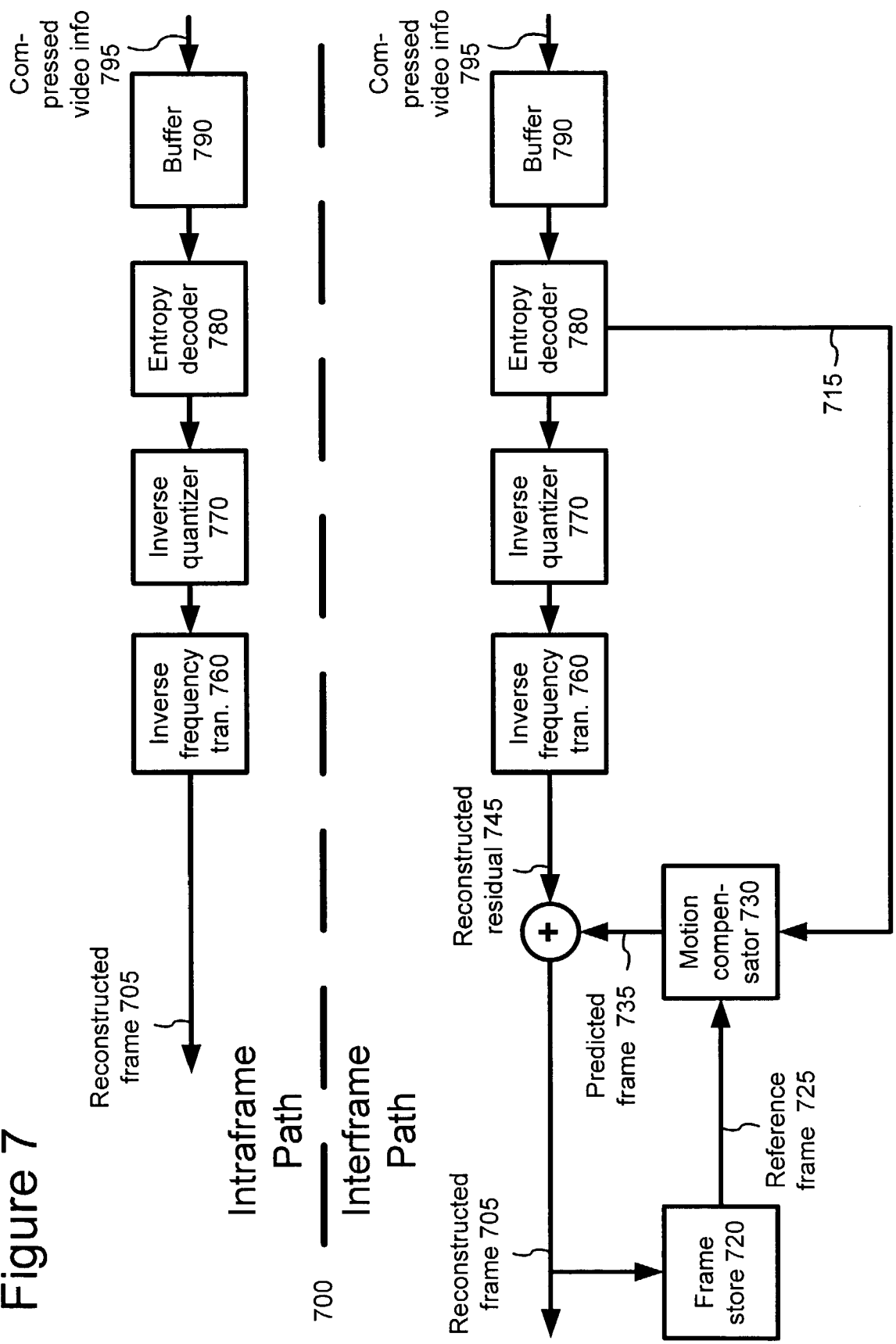
FIG. 7 is a block diagram of a generalized video decoder system used in several described embodiments.

FIG. 6 is a block diagram of a generalized video encoder (600) and FIG. 7 is a block diagram of a generalized video decoder (700).

The relationships shown between modules within the encoder and decoder indicate the main flow of information in the encoder and decoder; other relationships are not shown for the sake of simplicity. In particular, FIGS. 6 and 7 usually do not show side information indicating the encoder settings, modes, tables, etc. used for a video sequence, frame, macroblock, block, etc. Such side information is sent in the output bitstream, typically after entropy encoding of the side information. The format of the output bitstream can be a Windows Media Video format or another format.

The encoder (600) and decoder (700) are block-based and use a 4:2:0 macroblock format with each macroblock including 4 luminance 8×8 luminance blocks (at times treated as one 16×16 macroblock) and two 8×8 chrominance blocks. Alternatively, the encoder (600) and decoder (700) are object-based, use a different macroblock or block format, or perform operations on sets of pixels of different size or configuration than 8×8 blocks and 16×16 macroblocks.

Depending on implementation and the type of compression desired, modules of the encoder or decoder can be added, omitted, split into multiple modules, combined with other modules, and/or replaced with like modules. In alternative embodiments, encoder or decoders with different modules and/or other configurations of modules perform one or more of the described techniques.

A. Video Encoder

FIG. 6 is a block diagram of a general video encoder system (600). The encoder system (600) receives a sequence of video frames including a current frame (605), and produces compressed video information (695) as output. Particular embodiments of video encoders typically use a variation or supplemented version of the generalized encoder (600).

The encoder system (600) compresses predicted frames and key frames. For the sake of presentation, FIG. 6 shows a path for key frames through the encoder system (600) and a path for forward-predicted frames. Many of the components of the encoder system (600) are used for compressing both key frames and predicted frames. The exact operations performed by those components can vary depending on the type of information being compressed.

A predicted frame [also called p-frame, b-frame for bi-directional prediction, or inter-coded frame] is represented in terms of prediction (or difference) from one or more other frames. A prediction residual is the difference between what was predicted and the original frame. In contrast, a key frame [also called i-frame, intra-coded frame] is compressed without reference to other frames.

If the current frame (605) is a forward-predicted frame, a motion estimator (610) estimates motion of macroblocks or other sets of pixels of the current frame (605) with respect to a reference frame, which is the reconstructed previous frame (625) buffered in the frame store (620). In alternative embodiments, the reference frame is a later frame or the current frame is bi-directionally predicted. The motion estimator (610) outputs as side information motion information (615) such as motion vectors. A motion compensator (630) applies the motion information (615) to the reconstructed previous frame (625) to form a motion-compensated current frame (635). The prediction is rarely perfect, however, and the difference between the motion-compensated current frame (635) and the original current frame (605) is the prediction residual (645). Alternatively, a motion estimator and motion compensator apply another type of motion estimation/compensation.

A frequency transformer (660) converts the spatial domain video information into frequency domain (i.e., spectral) data. For block-based video frames, the frequency transformer (660) applies a discrete cosine transform ["DCT"] or variant of DCT to blocks of the motion prediction residual data, producing blocks of DCT coefficients. Alternatively, the frequency transformer (660) applies another conventional frequency transform such as a Fourier transform or uses wavelet or subband analysis. In some embodiments, the frequency transformer (660) applies a frequency transform to blocks of spatial prediction residuals for key frames. The frequency transformer (660) can apply an 8×8, 8×4, 4×8, or other size frequency transforms.

A quantizer (670) then quantizes the blocks of spectral data coefficients. The quantizer applies uniform, scalar quantization to the spectral data with a step-size that varies on a frame-by-frame basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder (600) can use frame dropping, adaptive filtering, or other techniques for rate control.

When a reconstructed current frame is needed for subsequent motion estimation/compensation, an inverse quantizer (676) performs inverse quantization on the quantized spectral data coefficients. An inverse frequency transformer (666) then performs the inverse of the operations of the frequency transformer (660), producing a reconstructed prediction residual (for a predicted frame) or a reconstructed key frame. If the current frame (605) was a key frame, the reconstructed key frame is taken as the reconstructed current frame (not shown). If the current frame (605) was a predicted frame, the reconstructed prediction residual is added to the motion-compensated current frame (635) to form the reconstructed current frame. The frame store (620) buffers the reconstructed current frame for use in predicting the next frame. In some embodiments, the encoder applies a deblocking filter to the reconstructed frame to adaptively smooth discontinuities in the blocks of the frame.

The entropy coder (680) compresses the output of the quantizer (670) as well as certain side information (e.g., motion information (615), quantization step size). Typical entropy coding techniques include arithmetic coding, differential coding, Huffman coding, run length coding, LZ coding, dictionary coding, and combinations of the above. The entropy coder (680) typically uses different coding techniques for different kinds of information (e.g., DC coefficients, AC coefficients, different kinds of side information), and can choose from among multiple code tables within a particular coding technique.

The entropy coder (680) puts compressed video information (695) in the buffer (690). A buffer level indicator is fed back to bitrate adaptive modules. The compressed video information (695) is depleted from the buffer (690) at a constant or relatively constant bitrate and stored for subsequent streaming at that bitrate. Alternatively, the encoder system (600) streams compressed video information immediately following compression.

Before or after the buffer (690), the compressed video information (695) can be channel coded for transmission over the network. The channel coding can apply error detection and correction data to the compressed video information (695).

B. Video Decoder

FIG. 7 is a block diagram of a general video decoder system (700). The decoder system (700) receives information (795) for a compressed sequence of video frames and produces output including a reconstructed frame (705). Particular embodiments of video decoders typically use a variation or supplemented version of the generalized decoder (700).

The decoder system (700) decompresses predicted frames and key frames. For the sake of presentation, FIG. 7 shows a path for key frames through the decoder system (700) and a path for forward-predicted frames. Many of the components of the decoder system (700) are used for decompressing both key frames and predicted frames. The exact operations performed by those components can vary depending on the type of information being compressed.

A buffer (790) receives the information (795) for the compressed video sequence and makes the received information available to the entropy decoder (780). The buffer (790) typically receives the information at a rate that is fairly constant over time, and includes a jitter buffer to smooth short-term variations in bandwidth or transmission. The buffer (790) can include a playback buffer and other buffers as well. Alternatively, the buffer (790) receives information at a varying rate.

Before or after the buffer (790), the compressed video information can be channel decoded and processed for error detection and correction.

The entropy decoder (780) entropy decodes entropy-coded quantized data as well as entropy-coded side information (e.g., motion information (715), quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder (780) frequently uses different decoding techniques for different kinds of information (e.g., DC coefficients, AC coefficients, different kinds of side information), and can choose from among multiple code tables within a particular decoding technique.

If the frame (705) to be reconstructed is a forward-predicted frame, a motion compensator (730) applies motion information (715) to a reference frame (725) to form a prediction (735) of the frame (705) being reconstructed. For example, the motion compensator (730) uses a macroblock motion vector to find a macroblock in the reference frame (725). A frame buffer (720) stores previous reconstructed frames for use as reference frames. Alternatively, a motion compensator applies another type of motion compensation. The prediction by the motion compensator is rarely perfect, so the decoder (700) also reconstructs prediction residuals.

When the decoder needs a reconstructed frame for subsequent motion compensation, the frame store (720) buffers the reconstructed frame for use in predicting the next frame. In some embodiments, the encoder applies a deblocking filter to the reconstructed frame to adaptively smooth discontnuities in the blocks of the frame.

An inverse quantizer (770) inverse quantizes entropy-decoded data. In general, the inverse quantizer applies uniform, scalar inverse quantization to the entropy-decoded data with a step-size that varies on a frame-by-frame basis or other basis. Alternatively, the inverse quantizer applies another type of inverse quantization to the data, for example, a non-uniform, vector, or non-adaptive quantization, or directly inverse quantizes spatial domain data in a decoder system that does not use inverse frequency transformations.

An inverse frequency transformer (760) converts the quantized, frequency domain data into spatial domain video information. For block-based video frames, the inverse frequency transformer (760) applies an inverse DCT ["IDCT"] or variant of IDCT to blocks of the DCT coefficients, producing motion prediction residual data. Alternatively, the frequency transformer (760) applies another conventional inverse frequency transform such as a Fourier transform or uses wavelet or subband synthesis. In some embodiments, the inverse frequency transformer (760) applies an inverse frequency transform to blocks of spatial prediction residuals for key frames. The inverse frequency transformer (760) can apply an 8×8, 8×4, 4×8, or other size inverse frequency transforms.

III. Global Luminance Change Estimation/Compensation

Some described embodiments involve techniques and tools for estimating, applying, coding and/or decoding global luminance changes described by a small number of parameters. The tools and techniques allow the same subjective and objective quality of reconstructed video to be achieved at a lower bit rate. Each individual tool or technique implements one or more of 1) a global luminance change compensation scheme; 2) parameterization of global luminance parameters; 3) computationally efficient estimation/extraction of global luminance parameters; 4) low-cost signaling of frames with global luminance change; and 5) low-cost signaling of global luminance parameters. The luminance change may be global to a frame, a field, a part of a frame/field such as an individual block, individual macroblock, or group of macroblocks, or another specific portion of an image. While much of the following description addresses parameterization and compensation for luminance change in an entire frame, the same framework for luminance change compensation can be used to (a) determine presence of fading in a portion (e.g., an individual block or macroblock) of an image, (b) compute fading parameters within this portion, and (c) parameterize and transmit these fading parameters for the given portion of the image. These techniques can be repeated for multiple portions of the image.

A global luminance change (also known as "fading") may be a change in the brightness and/or contrast of the scene. Typically, the change is linear, but fading can also be defined as including any smooth, nonlinear mapping within the same framework. Fading, morphing and blending are widely used in creation of video content for smoothing the evolution of video frames across scene transitions and for providing special effects. Further, certain sequences exhibit fading naturally due to changes in illumination. Video frames with effects such as fading, morphing, and blending require relatively large amounts of bits to encode with conventional motion-based video compression methods, which are generally not effective on such frames.

A. Global Luminance Change Compensation Scheme

FIG. 8 shows a technique (800) for encoding video using global luminance change compensation. An encoder such as the encoder (600) shown in FIG. 6 may perform the technique (800).

First, the encoder checks for fading (810) in a frame to be encoded, such as the current frame being encoded in a video sequence. If the encoder detects fading (810) for the frame, the encoder obtains fading parameters (820). For example, the encoder detects fading and obtains fading parameters as described below in Section C. Alternatively, the encoder uses a different technique to detect fading and/or obtain parameters. The encoder signals whether fading compensation is on or off, and, if on, signals the fading parameters as well.

If fading was detected for the frame, the encoder then performs fading compensation on one or more reference frames for the frame (830), for example, as described below in Section B. When the encoder performs fading compensation on multiple reference frames, the multiple reference frames may be before or after (in playback order) the frame being encoded. The encoder signals which portions of the frame being encoded are compensated from which of the multiple reference frames. For this signaling, the encoder may use signaling already used for reference frame selection in such systems. In some embodiments, the encoder may use both an original reference frame and a remapped reference frame in motion estimation/compensation for the frame to be encoded. The encoder may do this, for example, to encode a current frame that has both faded content and unfaded overlays.

After fading compensation, the encoder encodes the frame (840) using motion estimation/compensation from the adjusted reference frame(s). If the encoder does not detect fading, the encoder encodes the frame (840) without obtaining fading parameters or performing fading compensation. When encoding is done (850), the process ends.

FIG. 9 shows a technique (900) for decoding video encoded using fading compensation. A decoder such as the decoder (700) shown in FIG. 7 may perform the technique (900).

First, the decoder checks (910) whether fading is on or off for the frame to be decoded. One way to perform this checking is to check signaling information sent by an encoder. If the decoder determines that fading is on (910) for the frame, the decoder performs fading compensation (920). For example, the decoder gets fading parameters sent by the encoder and performs fading compensation (as done in the encoder) on one or more reference frames for the frame to be decoded.

The decoder then decodes the frame (930), for example, using motion compensation from the adjusted reference frame(s). If fading is off, the decoder decodes the frame (930) without performing fading compensation. When decoding is done (940), the process ends.

FIG. 10 shows an exemplary encoder framework (1000) for performing global luminance change compensation. In this framework (1000), the encoder conditionally remaps a reference frame using parameters obtained by fading estimation. The encoder performs remapping, or fading compensation, when the encoder detects fading with a good degree of certainty and consistency across the frame. Otherwise, fading compensation is an identity operation (i.e., output=input).

Referring to FIG. 10, the encoder compares a current frame (1010) with a reference frame (1020) using a fading detection module (1030) to determine whether fading is occurring. In some embodiments, the reference frame is the frame previous to the current frame in a video sequence. Alternatively, the reference frame is earlier than the previous frame or after the current frame. When multiple reference frames are used, the encoder may check for fading in each reference frame. The encoder produces a "fading on" or "fading off" signal (1040) based on the results of the fading detection.

If fading is on, the fading estimation module (1050) estimates fading parameters (1060) based on calculations performed on the current frame (1010) and the reference frame (1020). (Fading estimation details in some embodiments are discussed below in Section C.)

The fading compensation module (1070) uses the fading parameters (1060) to remap the reference frame (1020) (alternatively, multiple reference frames). The encoder can then use other encoder modules (1080) (e.g., motion estimation and compensation, frequency transformer, and quantization modules) to compress the frame. The encoder outputs motion vectors, residuals and other information (1090) that define the encoded current frame (1010). Aside from motion estimation/compensation with translational motion vectors, the framework for global luminance change compensation is applicable across a wide variety of motion compensation-based video codecs.

FIG. 11 shows an exemplary decoder framework (1100) for performing global luminance change compensation. The decoder produces a decoded current frame (1110). To decode an encoded fading-compensated frame, the decoder performs fading compensation on a previously decoded reference frame (1120) (alternatively, multiple reference frames) using a fading compensation module (1130).

The decoder performs fading compensation on the reference frame (1120) if the fading on/off signal (1140) indicates that fading is on for the encoded current frame (1110). The decoder performs fading compensation (as done in the encoder) by using the fading parameters (1150) obtained during fading estimation. Otherwise (if fading is off for the current frame), fading compensation is an identity operation (i.e., output=input).

The decoder can then use other decoder modules (1160) (e.g., motion compensation, inverse frequency transformer, and inverse quantization modules) to decompress the encoded frame using motion vectors, residuals and other information (1170) provided by the encoder.

B. Parameterization and Compensation

In video editing, synthetic fading is sometimes realized by applying a simple, pixel-wise linear transform to the luminance and chrominance channels. Likewise, cross-fading is sometimes realized as linear sums of two video sequences, with the composition changing over time. Accordingly, in some embodiments, an encoder such as one shown in the framework (1000) of FIG. 10 parameterizes fading (whether natural or synthetic) as a pixel-wise linear transform and parameterizes cross-fading as a linear sum, and a decoder such as one shown in the framework (1100) of FIG. 11 performs corresponding transforms.

Let I(n) be an image at frame n and I(n−1) be an image at the previous frame. Where motion is small, simple fading is modeled by the first order relationship in Equation 1. (The relation in Equation 1 is approximate because of possible motion in the video sequence.)

$$I(n) \approx C\,I(n-1)+B \qquad (1),$$

where the fading parameters B and C correspond to brightness and contrast, respectively. When nonlinear fading occurs, the first order component typically accounts for the bulk of the change.

Cross-fades from an image sequence U(n) to an image sequence V(n) can be modeled by the relationship in Equation 2. The relation in Equation 2 is approximate because of possible motion in the sequences.

$$\begin{aligned}I(n) &\approx \alpha n V + (1-\alpha n)U \qquad (2)\\ &\approx I(n-1)+\alpha(V-U)\\ &\approx \begin{cases}(1-\alpha)I(n-1) & n\approx 0\\ (1+\alpha)I(n-1) & n\approx \dfrac{1}{\alpha}\end{cases}\end{aligned}$$

n≈0 represents the beginning of the cross-fade, and n≈1/α represents the end of the cross-fade. For cross-fades spanning several frames, α is small. At the start of the cross-fade, the nth frame is close to an attenuated (contrast<1) version of the n−1th frame. Towards the end, the nth frame is an amplified (contrast>1) version of the n−1th frame. In other words, at the beginning of the cross-fade, the nth frame can be modeled as the n−1th frame scaled by the contrast value 1−α, while at the end of the cross-fade, the nth frame can be modeled as the n−1th frame scaled by the contrast value 1+α. Equation 2 shows that at the beginning and end of the cross-fade, the encoder can obtain the nth frame by remapping a reference frame (e.g., the n−1th frame) using a linear rule (such as those shown in Equations 3 and 4 below).

The encoder carries out compensation of global luminance change by remapping a reference frame. The encoder remaps the reference frame on a pixel-by-pixel basis, or on some other basis. The original, un-remapped reference frame is essentially discarded (although in a multiple reference frame scenario, the un-remapped reference may be used as well).

The following linear rule, based on Equation 1, remaps the luminance values of the reference frame R to the remapped reference frame R̂ in terms of the two parameters B and C (corresponding to brightness and contrast of the scene):

$$\hat{R} \approx CR+B \qquad (3)$$

The luminance values of the reference frame are scaled (or, "weighted") by the contrast value and shifted (i.e., by adding an offset) by the brightness value. For chrominance, the remapping follows the rule:

$$\hat{R} \approx C(R-\mu)+\mu \qquad (4)$$

where μ the mean of the chrominance values. In one embodiment, 128 is assumed to be the mean for unsigned 8-bit representation of chrominance values. This rule for chrominance remapping does not use a brightness component.

In some embodiments, the two-parameter linear remapping used in Equations 3 and 4 is extended to higher order terms. For example, Equation 5 is a second-order equation that remaps the luminance values of R to R̂:

$$\hat{R} \approx C_1 R^2 + C_2 R + B \qquad (5)$$

Other embodiments use other remapping rules. In one category of such remapping rules, for non-linear fading, linear mappings are replaced with non-linear mappings.

C. Estimation of Fading Parameters

Fading estimation is the process of computing fading parameters during he encoding process. An encoder such as one shown in the framework (1000) of FIG. 10 may compute brightness (B) and contrast (C) parameters during the encoding process.

Figure 12:
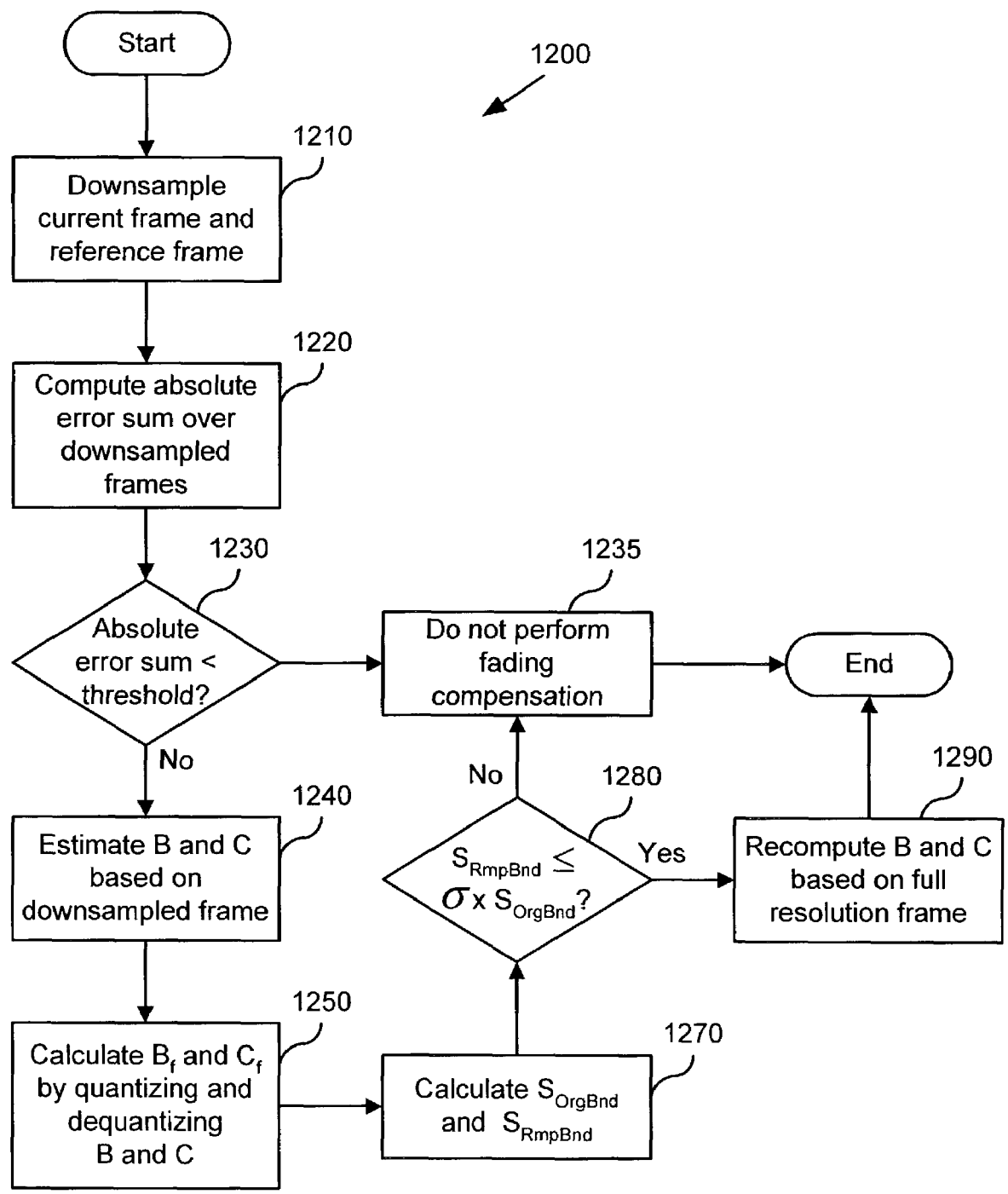
FIG. 12 is a flowchart showing a technique for fading detection and parameter extraction.

In some embodiments, in order to estimate parameters accurately and in a speedy manner, the encoder uses the technique (1200) illustrated in FIG. 12. In the illustrated technique, only the luminance channel is analyzed. Alternatively, the encoder includes chrominance in the analysis when more computational resources are available. For example, the encoder solves for C in Equations 3 and 4 (not just Equation 3) to make C more robust.

In the embodiment illustrated in FIG. 12, motion in the scene is ignored during the fading estimation process. This is based on the observations that (a) fades and cross fades typically happen at still or low-motion scenes and (b) the utility of global luminance change compensation in high motion scenes is very low. Alternatively, the encoder jointly solves for fading parameters and motion information. Motion information is then used to refine the accuracy of fading parameters at the later stages of the technique (1200) or at some other time. One way to use motion information is to omit from the fading estimation computation those portions of the reference frame in which movement is detected.

In various parts of the technique (1200), the absolute error sums of Σabs(I(n)−R) or Σabs(I(n)−R̂) serve as metrics for determining the existence and parameters of fading. Alternatively, the encoder uses other or additional metrics such as sum of squared errors ["SSE"] or mean squared error ["MSE"] over the same error term, or the encoder uses a different error term.

At various points during the technique (1200), the encoder may end the technique (1200) upon satisfaction of an exit condition. FIG. 12 shows several exit conditions. For another exit condition (not shown in FIG. 12), the encoder checks whether the contrast parameter is close to 1.0 (in one implementation, 0.99<C<1.02) at the start or at an intermediate stage of the technique (1200) and, if so, ends the technique (1200).

The encoder begins the process (1200) by downsampling the current frame and the reference frame (1210). In one implementation, the encoder downsamples by a factor of 4 horizontally and vertically. Alternatively, the encoder downsamples by another factor, or does not downsample at all.

The encoder then computes the absolute error sum Σabs($I_d$(n)−$R_d$) over the lower-resolution versions of the current and reference frames (indicated by the subscript d) (1220). The absolute error sum measures differences in pixel values between the downsampled current frame and the downsampled reference frame. If the absolute error sum is smaller than a certain threshold (1230) (e.g., a pre-determined difference measure between luminance values for pixels in the downsampled current and reference frames), the encoder concludes that no fading has occurred and does not perform fading compensation (1235).

Otherwise, the encoder estimates brightness (B) and contrast (C) parameters (1240). First cut estimates for B and C are obtained by modeling $I_d(n)$ in terms of $R_d$. In one embodiment, the brightness and contrast parameters are obtained through linear regression over the entire downsampled frame. In other embodiments, the encoder uses other forms of statistical analysis such as total least squares, least median of squares, etc. for more robust analysis. For example, the encoder minimizes the MSE or SSE of the error term $I_d(n)-R_d$. In some circumstances, MSE and SSE are not robust, so the encoder also tests the absolute error sum for the error term. The encoder discards high error values for particular points (which may be due to motion rather than fading).

The encoder then calculates $B_f$ and $C_f$ by quantizing and dequantizing B and C (1250). The first cut parameters are quantized and dequantized, giving $B_f$ and $C_f$, to ensure that they lie within the permissible range and to test for compliance. In some embodiments, for typical 8-bit depth imagery, B and C are quantized to 6 bits each. B takes on integer values from −32 to 31 represented as a signed 5-bit integer. The quantized value of C, represented as $C_q$, varies from 0.515625 to 1.484375, in uniform steps of 0.015625 (1/64), corresponding to quantized values 1 through 63. Quantization is performed by rounding B and C to the nearest valid dequantized value and picking the appropriate bin index.

The encoder then calculates the original bounded absolute error sum ($S_{OrgBnd}$) and remapped bounded absolute error sum ($S_{RmpBnd}$) (1270). In some embodiments, the encoder calculates the sums using a goodness-of-fit analysis. For a random or pseudorandom set of pixels at the original resolution, the encoder computes the remapped bounded absolute error sum $\Sigma babs(I(n)-C_f R-B_f)$, where $\Sigma abs(x)=min(abs(x), M)$ for some bound M. In one implementation, M is a multiple of the quantization parameter of the frame being encoded. The bound M is higher when the quantization parameter is coarse, and lower when the quantization parameter is fine. The encoder also accumulates the original bounded absolute error sum $\Sigma abs(I(n)-R)$. If computational resources are available, the encoder may compute the bounded error sums over the entire frames.

Then, based on the relative values of the original and remapped bounded absolute error sum, the encoder determines whether or not to use fading compensation (1280). For example, in some embodiments, the encoder does not perform fading compensation unless the remapped bounded absolute error sum is less than or equal to some threshold percentage σ of the original bounded absolute error sum. In one implementation, σ=0.95. If the encoder is performing fading compensation, the encoder recomputes the fading parameters, this time based on a linear regression between I(n) and R, but at the full resolution (1290). To save computation time, the encoder can perform the repeated linear regression over the random or pseudorandom sampling of the frame. Again, the encoder can alternatively use other forms of statistical analysis (e.g., total least squares, least median of squares, etc.) for more robust analysis. When encoding is done (1295), the process ends.

In one embodiment, the encoder allows a special case in which c=−1 in Equations 3 and 4. The special case is signaled by $C_q$=0 in the bitstream. In this "invert" mode, the reference frame is inverted before shifting by B and the range of B is 193 to 319 in uniform steps of two.

D. Signaling

An encoder such as one shown in the framework (1000) of FIG. 10 sends fading on/off signaling information as well as fading parameters. A decoder such as one shown in the framework (1100) of FIG. 11 receives the signaling information and fading parameters.

In some embodiments, at the sequence level, the encoder sends one bit to indicate whether global luminance change compensation is enabled for the sequence. The encoder also can signal global luminance change at the frame level and/or signal global luminance change for a portion of a frame, such as an individual block or macroblock in a frame.

Among the frames in a typical video sequence, the occurrence of global luminance change or fading is rare. It is possible to signal fading (or, equivalently, the absence of fading) by adding a bit. For example, the encoder can signal fading (or, equivalently, the absence of fading) at the frame level by using one bit. However, it is more economical to signal fading (or, equivalently, the absence of fading) jointly with other information. For example, the encoder performs frame-level signaling using an escape sequence in a variable length code (VLC) table for motion mode (i.e., the number and configuration of motion vectors, the sub-pixel interpolation scheme). In such embodiments, the encoder jointly signals the least frequent motion mode and the activation of fading compensation.

Let the event F represent the existence of fading and G represent the choice of the least frequent motion mode for the frame. Let the VLC <MVMODE> represent a motion mode when G is false. This VLC table is designed with an escape symbol <ESC> used to signal when F and/or G is true. Table 1 illustrates the joint coding of F and the motion mode, followed by the fading parameters B and C when fading compensation is activated.

TABLE 1

Joint coding of least frequent motion mode and fading signal

|  | G = false | G = true |
| --- | --- | --- |
| F = false | <MVMODE> | <ESC> 0 |
| F = true | <ESC> 1 <MVMODE>[B][C] | <ESC> 1 <ESC> [B][C] |

If global luminance change is activated for a certain frame, another VLC (either <MVMODE> or <ESC>) follows to indicate the motion mode. Then, the parameters are signaled using two 6-bit fixed-length code words for B and C, respectively. Alternatively, the parameters are signaled using VLCs. When applied to an individual portion of a frame, such as a block or a macroblock, the encoder can signal the fading parameters independently with that portion. For example, if fading applies to only a macroblock of the video frame, the fading information can be signaled by joint entropy codes with macroblock-level information such as the coded block pattern or transform type.

Figure 13:
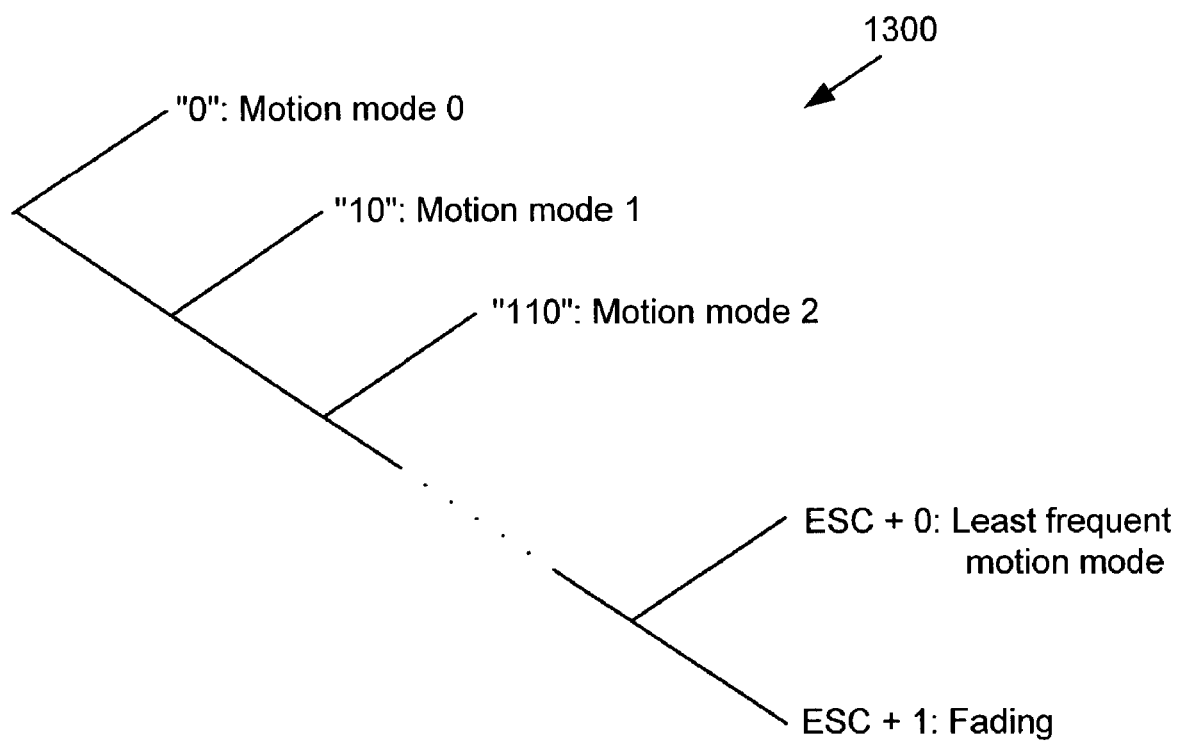
FIG. 13 is a chart showing a signaling scheme for indicating whether to use fading compensation for a frame.

FIG. 13 is a tree diagram showing a coding arrangement (corresponding to Table 1, for one implementation) where the encoder jointly codes the least frequent motion mode and the existence of fading. (Details of coding for fading parameters are omitted.) The encoder uses VLCs to represent each of the other motion modes (e.g., the codes "0," "10," and "110" represent motion modes 0, 1 and 2, respectively). The encoder uses an escape code (e.g., "111") followed by a "0" to represent the least frequent motion mode when fading is not activated. The encoder uses the escape code followed by a "1" to indicate that fading is activated.

It should be understood that the programs, processes, or methods described herein are not related or limited to any particular type of computing environment, unless indicated otherwise. Various types of general purpose or specialized computing environments may be used with or perform operations in according with the teachings described herein. Elements of embodiments shown in software may be implemented in hardware and vice versa.

In view of the many possible embodiments to which the principles of our invention may be applied, we claim as our invention all such embodiments as may come within the scope and the spirit of the following claims and equivalents thereto.

We claim:

1. A computer-implemented method for transforming encoded video information using a computing device that implements a video decoder, the computing device comprising a processing unit and memory, the method comprising, during video decoding:

with the computing device that implements the video decoder;
receiving and processing, at a video sequence level, a fading compensation capability signal for a video sequence;
if fading compensation is enabled, receiving and processing, at frame level, one or more fading compensation on/off signals for video frames in the video sequence, wherein fading parameters follow, at the frame level, the one or more fading compensation on/off signals; and
if fading compensation is enabled, performing fading compensation for at least part of a current video frame, comprising adjusting plural pixel values in a reference video frame based at least in part on the fading parameters.

2. The method of claim 1 wherein the one or more fading compensation on/off signals comprise one bit per video frame indicating whether or not fading compensation is used for that video frame.

3. The method of claim 1 wherein the one or more fading compensation on/off signals comprise one or more entropy codes per video frame, the one or more entropy codes jointly indicating whether or not fading compensation is used and other frame-level information.

4. A computer-readable medium storing computer-executable instructions for causing a computer system programmed thereby to perform the method of claim 1.

5. A computer-implemented method for transforming video information using a computing device that implements a video encoder, the computing device comprising a processing unit and memory, the method comprising, during video encoding:

with the computing device that implements the video encoder;
for each of plural video frames:
detecting global luminance change in the video frame;
if global luminance change is detected in the video frame, estimating global luminance change parameters for the video frame;
determining a value of a global luminance change compensation on/off signal for the video frame, wherein the value depends on whether global luminance change compensation is used for the video frame;
entropy coding the value for the global luminance change compensation on/off signal jointly with other frame-level information for the video frame;
signaling results of the entropy coding at frame level;
signaling the global luminance change parameters at frame level; and
if global luminance change is detected in the video frame, performing global luminance change compensation for at least part of the video frame, comprising adjusting plural pixel values in a reference video frame based at least in part on the global luminance change parameters.

6. The method of claim 5 further comprising:
signaling a value of a global luminance change compensation capability on/off signal for a sequence that includes the plural video frames.

7. The method of claim 5 wherein the results of the entropy coding comprise a variable length code that at least in part indicates both the value of the global luminance change compensation on/off signal for the video frame and the value of other frame-level information for the video frame.

8. The method of claim 5 wherein the results of the entropy coding comprise a variable length code selected from a single variable length code table with plural variable length codes.

9. The method of claim 8 wherein the variable length code is an escape code.

10. The method of claim 5 wherein the other frame-level information is motion mode information for the video frame.

11. The method of claim 5 wherein, if global luminance change compensation is on for the video frame, the results of the entropy coding are a first variable length code, a single bit following the first variable length code, and a second variable length code following the single bit, and wherein the single bit distinguishes a global luminance change compensation on signal from a least-frequently-occurring motion mode.

12. The method of claim 5 wherein, if global luminance change compensation is off for the video frame:
if motion mode for the video frame is a least-frequently-occurring motion mode, the results of the entropy coding are a variable length code and single bit that indicate the least-frequently-occurring motion mode for the video frame; and
otherwise, the results of the entropy coding are a variable length code that indicates the motion mode for the video frame.

13. A computer-readable medium storing computer-executable instructions for causing a computer system programmed thereby to perform the method of claim 5.

14. A computer-implemented method for transforming encoded video information using a computing device that implements a video decoder, the computing device comprising a processing unit and memory, the method comprising, during video decoding:

with the computing device that implements the video decoder;
for each of plural video frames,
receiving information at frame level, wherein the information comprises results of entropy coding of a value of a global luminance change compensation on/off signal for the video frame jointly with other frame-level information for the video frame;
from the received information, entropy decoding the value of the global luminance change compensation on/off signal and the other frame-level information for the video frame;
determining whether global luminance change compensation is on or off for the video frame based upon the global luminance change compensation on/off signal for the video frame;

if global luminance change compensation is on, receiving global luminance change parameters for the video frame; and if global luminance change compensation is on, performing global luminance change compensation for at least part of the video frame, comprising adjusting plural pixel values in a reference video frame based at least in part on the global luminance change parameters.

15. The method of claim 14 further comprising:
receiving a value of a global luminance change compensation capability on/off signal for a sequence that includes the plural video frames.

16. The method of claim 14 wherein the results of the entropy coding comprise a variable length code that at least in part indicates both the value of the global luminance change compensation on/off signal for the video frame and the value of other frame-level information for the video frame.

17. The method of claim 14 wherein the results of the entropy coding comprise a variable length code selected from a single variable length code table with plural variable length codes.

18. The method of claim 17 wherein the variable length code is an escape code.

19. The method of claim 14 wherein the other frame-level information is motion mode information for the video frame.

20. The method of claim 14 wherein, if global luminance change compensation is on for the video frame, the results of the entropy coding are a first variable length code, a single bit following the first variable length code, and a second variable length code following the single bit, and wherein the single bit distinguishes a global luminance change compensation on signal from a least-frequently-occurring motion mode.

21. The method of claim 14 wherein, if global luminance change compensation is off for the video frame:

if motion mode for the video frame is a least-frequently-occurring motion mode, the results of the entropy coding are a variable length code and single bit that indicate the least-frequently-occurring motion mode for the video frame; and otherwise, the results of the entropy coding are a variable length code that indicates the motion mode for the video frame.

22. A computer-readable medium storing computer-executable instructions for causing a computer system programmed thereby to perform the method of claim 14.

23. A computer-implemented method for transforming video information using a computing device that implements a video encoder, the computing device comprising a processing unit and memory, the method comprising, during video encoding:

with the computing device that implements the video encoder;

signaling, at a video sequence level, a fading compensation capability signal for a video sequence;

if fading compensation is enabled, signaling, at frame level, one or more fading compensation on/off signals for video frames in the video sequence, wherein fading parameters follow, at the frame level, the one or more fading compensation on/off signals; and if fading compensation is enabled, performing fading compensation for at least part of a current video frame, comprising adjusting plural pixel values in a reference video frame based at least in part on the fading parameters.

24. The method of claim 23 wherein the one or more fading compensation on/off signals comprise one bit per video frame indicating whether or not fading compensation is used for that video frame.

25. The method of claim 23 wherein the one or more fading compensation on/off signals comprise one or more entropy codes per video frame, the one or more entropy codes jointly indicating whether or not fading compensation is used and other frame-level information.

26. A computer-readable medium storing computer-executable instructions for causing a computer system programmed thereby to perform the method of claim 23.

27. A method for transforming video information using a computing device that implements a video encoder, the computing device comprising a processing unit and memory, the method comprising, during video encoding:

with the computing device that implements the video encoder;

signaling a fading compensation flag at a first syntax level in a video sequence; and when the fading compensation flag at the first syntax level indicates fading compensation is activated for a current video frame in the video sequence, signaling one or more fading parameters at a second syntax level lower than the first syntax level in the video sequence, wherein the one or more fading parameters are for fading compensation for at least part of the current video frame, and wherein the fading compensation comprises adjusting plural pixel values in a reference video frame based at least in part on the one or more fading parameters.

28. The method of claim 27 wherein the plural pixel values in the reference video frame comprise luminance values and chrominance values.

29. The method of claim 27 wherein the plural pixel values include all pixel values in the reference video frame.

30. The method of claim 27 wherein the first syntax level is sequence level and the second syntax level is frame level.

31. The method of claim 27 wherein the fading compensation comprises adjusting plural pixel values in multiple reference video frames.

32. A computer-readable medium storing computer-executable instructions for causing a computer system programmed thereby to perform the method of claim 27.

33. A method for transforming encoded video information using a computing device that implements a video decoder, the computing device comprising a processing unit and memory, the method comprising, during video decoding:

with the computing device that implements the video decoder;

receiving and processing a fading compensation flag at a first syntax level in a video sequence; and when the fading compensation flag at the first syntax level indicates fading compensation is activated for a current video frame in the video sequence, receiving and processing one or more fading parameters at a second syntax level lower than the first syntax level in the video sequence, wherein the one or more fading parameters are for fading compensation for at least part of the current video frame, and wherein the fading compensation comprises adjusting plural pixel values in a reference video frame based at least in part on the one or more fading parameters.

34. The method of claim 33 wherein the plural pixel values in the reference video frame comprise luminance values and chrominance values.

35. The method of claim 33 wherein the plural pixel values include all pixel values in the reference video frame.

36. The method of claim 33 wherein the first syntax level is sequence level and the second syntax level is frame level.

37. The method of claim 33 wherein the fading compensation comprises adjusting plural pixel values in multiple reference video frames.

38. A computer-readable medium storing computer-executable instructions for causing a computer system programmed thereby to perform the method of claim 33.

* * * * *

UNITED STATES PATENT AND TRADEMARK OFFICE
CERTIFICATE OF CORRECTION

PATENT NO. : 7,609,767 B2 Page 1 of 1
APPLICATION NO. : 10/379079
DATED : October 27, 2009
INVENTOR(S) : Srinivasan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1620 days.

Signed and Sealed this

Twelfth Day of October, 2010

David J. Kappos
*Director of the United States Patent and Trademark Office*